(12) United States Patent
Toge

(10) Patent No.: US 7,773,856 B2
(45) Date of Patent: Aug. 10, 2010

(54) VIDEO AND AUDIO RECORDING APPARATUS

(75) Inventor: Shinichi Toge, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1114 days.

(21) Appl. No.: 11/438,297

(22) Filed: May 23, 2006

(65) Prior Publication Data

US 2006/0269223 A1    Nov. 30, 2006

(30) Foreign Application Priority Data

May 24, 2005    (JP) .............................. P2005-151093

(51) Int. Cl.
*H04N 5/91* (2006.01)
*H04N 7/26* (2006.01)
*H04N 5/00* (2006.01)
(52) U.S. Cl. .......................... 386/46; 386/124; 386/125
(58) Field of Classification Search .................... 386/46, 386/124, 125
See application file for complete search history.

(56) References Cited

U.S. PATENT DOCUMENTS

2002/0172496 A1* 11/2002 Gunji et al. .................... 386/46
2003/0210893 A1* 11/2003 Natsubori et al. ............. 386/83
2005/0008336 A1* 1/2005 Ishida ........................... 386/95

FOREIGN PATENT DOCUMENTS

| JP | 2001-167491 | 6/2001 |
|----|-------------|--------|
| JP | 2002-175650 | 6/2002 |
| JP | 2002-223410 | 8/2002 |
| JP | 2003-319272 | 11/2003 |
| JP | 2004-120477 | 4/2004 |
| JP | 2004-153728 | 5/2004 |
| WO | 02/28100 | 4/2002 |

* cited by examiner

*Primary Examiner*—Marsha D Banks Harold
*Assistant Examiner*—Asher Khan
(74) *Attorney, Agent, or Firm*—Morgan, Lewis & Bockius LLP

(57) ABSTRACT

A video and audio recording apparatus includes: a reservation inputting unit to which a recording reservation is inputted; an area ensuring unit adapted to ensure a preferential recording area in an information recording medium; and a reserved-recording performing unit adapted to record a broadcast program on the ensured preferential recording area, wherein: the reservation inputting unit is adapted to prompt a user to input the number of times of broadcasting a recording-reserved broadcast program; the area ensuring unit is adapted to ensure a preferential recording area whose size is obtained by multiplying the size of a recording area needed to record one part of the recording-reserved program, which part is to be broadcasted one time, by the number of times; and the reserved-recording performing unit performs the recording of the recording-reserved broadcast program on the preferential recording area the inputted number of times.

4 Claims, 8 Drawing Sheets

FIG. 8A

| | | | | | |
|---|---|---|---|---|---|
| TUESDAY | 9:00 PM ~ 10:00 PM | 6ch | SP | HDD | PREFERENTIAL 12 |
| THURSDAY | 8:00 PM ~ 9:00 PM | 8ch | SP | HDD | NORMAL |

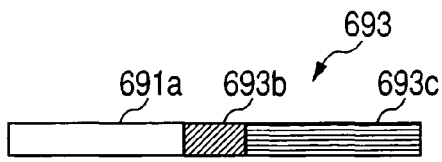

FIG. 8B

| | | | | | |
|---|---|---|---|---|---|
| TUESDAY | 9:00 PM ~ 10:00 PM | 6ch | SP | HDD | PREFERENTIAL 12 |
| THURSDAY | 8:00 PM ~ 9:00 PM | 8ch | SP | HDD | NORMAL |
| MONDAY TO THURSDAY | 11:00 PM ~ 11:15 PM | 2ch | SP | HDD | PREFERENTIAL 24 |
| 4/15 | 9:00 PM ~ 11:15 PM | 4ch | SP | HDD | PREFERENTIAL |

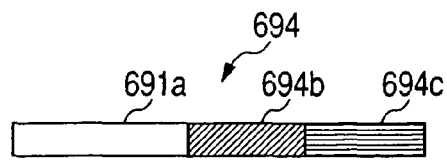

FIG. 8C

| | | | | | |
|---|---|---|---|---|---|
| TUESDAY | 9:00 PM ~ 10:00 PM | 6ch | SP | HDD | PREFERENTIAL 12 |

FREE AREA IS INSUFFICIENT. A RECORDING AREA HAVING A NECESSARY SIZE CAN NOT BE ENSURED. PLEASE DELETE UNNECESSARY PROGRAMS. ALTERNATIVELY, PLEASE CHANGE RESERVATION DATA.

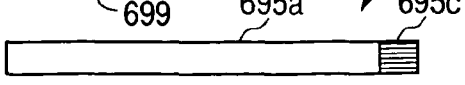

VIDEO AND AUDIO RECORDING APPARATUS

BACKGROUND OF THE INVENTION

1. Field of the Invention

The present invention relates to a video and audio recording apparatus adapted to ensure a preferential recording area of a size, which is needed to record a recording-reserved broadcast program, on an information recording medium, and to record a broadcast program in an ensured preferential recording area according to a recording reservation.

2. Description of the Related Art

In a case where a recording-reservation of a desired broadcast program is performed, even when a user is absent at a moment at which the program is actually broadcasted, the desired program can be recorded. However, it is necessary therefor that a free area sufficient to record the broadcast program to be record is provided. Therefore, in a case where a free area is insufficient therefor, even when a recording reservation is made, reserved-recording is not performed. Thus, the following technique (hereunder referred to as a first related technique) has been proposed. That is, according to this technique, it can be designated which of automatic recording and normal recording is performed corresponding to each of set recording reservations. Also, this technique is adapted to ensure an exclusive recording area for automatic recording, which has a size sufficient to record a broadcast program that is longest in recording time among a plurality of broadcast programs for which automatic recording is designated, and to always record the broadcast programs, for which automatic recording is designated, in the exclusive recording area for automatic recording. That is, this technique is adapted so that the broadcast program set to be recorded by automatic recording is recorded in an overwrite mode in the preliminarily ensured exclusive recording area for automatic recording. Thus, even in a case where the recording of the broadcast program is performed over many times, a recording area can always be ensured. This prevents an occurrence of a situation in which reserved-recording of a broadcast program is not performed because there is no recording area sufficient for the program. Also, this prevents an occurrence of a situation in which recorded areas unnecessarily increase (see, for example, JP-A-2001-167491).

Also, the following technique (hereunder referred to as a second related technique) has been proposed. That is, according to this technique, necessary recording-capacity for recording a recording-reserved broadcast program is calculated. Then, the necessary recording area for recording the aforementioned program is ensured in units of continuous LBAs (logical block addressing) and physical sectors on a hard disk drive (HDD) until the recording is started. Then, in a state in which the necessary recording area for recording the aforementioned program is ensured, the recording is performed when a recording start time arrives. That is, "when the recording/storage of a video stream is started, a certain continuous recording area having a size of the program to be recorded is determined on a HDD, so that there is no necessity for searching for a free area by a file system every time when the recording is subsequently and actually performed. This can prevent reduction in recording-speed, which is due to an ordinary operation of the file system. Also, because the video stream is recorded in the certain continuous recording area, structural reduction in recording-speed, which is caused by a jumping movement of a recording head between discontinuous recording areas, can be prevented. Thus, an accessing speed at a recording operation, and at what is called a "time shift" operation of reproducing the same broadcast program by shifting reproduction start times can largely be improved (see, for instance, JP-A-2004-120477)."

SUMMARY OF THE INVENTION

In the case of using the first related technique, the following problems occur. That is, although the recording area necessary for recording is always ensured, the recording method is an overwrite method. Thus, for example, in a case where a broadcast program, for instance, a drama, which is a serial program to be broadcasted every specific day of the week, is set to be recorded by automatic recording, every time when such a broadcast program is recorded, the program broadcasted the last time is deleted by overwriting. Therefore, it is difficult to apply this related technique to a case where the entire first to last episodes of the drama to be broadcasted every week are recorded and stored.

According to the first related technique, "when a user of a TV receiver selects a program that is being viewed by the user in a case where the user wishes to view this program or where this program is being viewed by the user, and when the user depresses a recording button by using a remote control device attached to a program storage apparatus without a preliminary recording reservation using EPG information", the user obtains broadcast program information on the date and the time of broadcasting the program, the No. of the channel, on which the program is broadcasted, the title of the broadcast program, and Subsequently, the necessary recording capacity for recording and storing the broadcast program is obtained. That is, each time when the recording of the broadcast program is instructed by the user, a necessary recording area for recording and storing the broadcast program is ensured. Therefore, in a case where a broadcast program to be broadcasted every week, for example, the first to the last episodes of a drama to be broadcasted every week are recorded by making a recording reservation, the recording reservation should be made corresponding to each of the episodes of the drama. At that time, it is not assurable that a free area needed to record each of the episodes of the drama is always ensured. That is, the inputting of one recording reservation cannot ensure the achievement of recording of the entire first to last episodes of the drama.

The invention is created to solve the aforementioned problems. Accordingly, an object of the invention is to provide a video and audio recording apparatus enabled to surely record the entire program, whose parts are broadcasted over a plurality of times, by making only one recording reservation, to prevent unnecessary increase in the number of items to be inputted when a recording-reservation is made, to inform a user of the size of a free area available for recording other broadband programs, and to release a recording area, the insurance of which becomes unnecessary, as a free area.

Another object of the invention is to provide a video and audio recording apparatus enabled to ensure a recording area, whose size is obtained by multiplying the size of a recording area needed to record one part of a recording-reserved program, which part is to be broadcasted one time, by the number of times of broadcasting the recording-reserved program as a preferential recording area to thereby surely record the entire program, whose parts are broadcasted over a plurality of times, by making only one recording reservation.

Also, an object of the invention is to provide a video and audio recording apparatus enabled to designate the mode of a recording-reservation, which is being inputted, as a preferential recording mode, and to prompt a user to input the number of times of broadcasting the recording-reserved program in a case where the recording-reserved program is a program to be broadcasted a plurality of times, for example, a program to be broadcasted every specific day of the week, thereby prevent unnecessary increase in the number of items to be inputted when a recording-reservation is made.

Also, an object of the invention is to provide a video and audio recording apparatus enabled to inform a user of the size of a free area available for recording other broadcast programs by indicating, when a preferential recording area is ensured, the size of the ensured preferential recording area and that of the free area other than the preferential recording area.

To solve the aforementioned problems, according to a first aspect of the invention, there is provided a video and audio recording apparatus including: a reservation inputting unit to which a recording reservation of a broadcast program received by a tuner portion is inputted; an area ensuring unit adapted to ensure a preferential recording area, which has a size necessary for recording a recording-reserved broadcast program, in an information recording medium; and a reserved-recording performing unit adapted to record a broadcast program on the ensured preferential recording area according to the recording reservation, wherein: the reservation inputting unit is adapted to receive a designation indicating which of two modes is employed between a preferential recording mode, in which recording of the program is performed on the ensured preferential recording area, and a normal recording mode, in which recording of the program is performed on a recording area during the recording is performed, so as to perform recording corresponding to a recording reservation that is being inputted, and is also adapted to prompt a user to input the number of times of broadcasting the program in a case where the preferential recording mode is designated corresponding to the recording reservation, which is being inputted, and where the recording reservation, which is being inputted, is a reservation of recording a broadcast program to be broadcasted over a plurality of times, which includes a reservation of recording the program every specific day of a week; the area ensuring unit is adapted to ensure a preferential recording area whose size is obtained by multiplying the size of a recording area needed to record one part of the recording-reserved program, which part is to be broadcasted one time, by the number of times of broadcasting the recording-reserved program, and is also adapted to indicate a size of the preferential recording area and that of a free area other than the preferential recording area, and to release, when the recording reservation, for which the preferential recording area is ensured, is canceled, a part of the preferential recording area, in which no program is recorded, as a free area in the preferential recording area ensured for the recording reservation that is canceled; and the reserved-recording performing unit performs the recording of the recording-reserved broadcast program on the preferential recording area the inputted number of times of broadcasting.

That is, when the inputting of the recording reservation is finished, the preferential recording area having a necessary size for recording the entire first to last episodes of the program is ensured. Also, in a case where the preferential recording mode is not designated for the recording reservation, and where the number of times of broadcasting the recording-reserved program is 1 though the preferential recording mode is designated for the recording reservation, a user is not prompted to input the number of times of broadcasting the program. Also, in a case where the free area changes because the preferential recording area is ensured, the size of the free area is indicated every time when the free area changes. Also, the preferential recording area, the assurance of which becomes unnecessary, is released as the free area.

According to a second aspect of the invention, there is provided a video and audio recording apparatus including: a reservation inputting unit to which a recording reservation of a broadcast program received by a tuner portion is inputted; an area ensuring unit adapted to ensure a preferential recording area, which has a size necessary for recording a recording-reserved broadcast program, in an information recording medium; and a reserved-recording performing unit adapted to record a broadcast program on the ensured preferential recording area according to the recording reservation, wherein: the reservation inputting unit is adapted to prompt a user to input the number of times of broadcasting a recording-reserved broadcast program; the area ensuring unit is adapted to ensure a preferential recording area whose size is obtained by multiplying the size of a recording area needed to record one part of the recording-reserved program, which part is to be broadcasted one time, by the number of times of broadcasting the recording-reserved program; and the reserved-recording performing unit performs the recording of the recording-reserved broadcast program on the preferential recording area the inputted number of times of broadcasting.

That is, when the inputting of the recording reservation is finished, the preferential recording area having a necessary size for recording the entire first to last episodes of the program is ensured.

According to a third aspect of the invention, the video and audio recording apparatus according to the second aspect of the invention, wherein the reservation inputting unit is adapted to receive a designation indicating which of two modes is employed between a preferential recording mode, in which recording of the program is performed on the ensured preferential recording area, and a normal recording mode, in which recording of the program is performed on a recording area during the recording is performed, so as to perform recording corresponding to a recording reservation that is being inputted, and is also adapted to prompt a user to input the number of times of broadcasting the program in a case where the preferential recording mode is designated corresponding to the recording reservation, which is being inputted, and where the recording reservation, which is being inputted, is a reservation of recording a broadcast program to be broadcasted over a plurality of times, which includes a reservation of recording the program every specific day of a week.

That is, in a case where the preferential recording mode is not designated for the recording reservation, and where the number of times of broadcasting the recording-reserved program is 1 though the preferential recording mode is designated for the recording reservation, a user is not prompted to input the number of times of broadcasting the program.

According to a fourth aspect of the invention, the video and audio recording apparatus according to the second or the third aspect of the invention, wherein the area ensuring unit is adapted to indicate, when the preferential recording area is ensured, a size of the ensured preferential recording area and that of a free area other than the preferential recording area.

That is, in a case where the free area changes because the preferential recording area is ensured, the size of the free area is indicated every time when the free area changes.

According to the invention, when the inputting of the recording reservation is finished, the preferential recording area having a necessary size for recording the entire first to last episodes of the program is ensured. Also, in a case where the preferential recording mode is not designated for the recording reservation, and where the number of times of broadcasting the recording-reserved program is 1 though the preferential recording mode is designated for the recording reservation, a user is not prompted to input the number of times of broadcasting the program. Also, in a case where the free area changes because the preferential recording area is ensured, the size of the free area is indicated every time when the free area changes. Also, the preferential recording area, the assurance of which becomes unnecessary, is released as the free area. Thus, the entire broadcast program, which is to be broadcasted over a plurality of times, can surely be recorded by making a recording reservation only once. Also, unnecessary increase in the number of items, which are to be inputted when a recording-reservation is made, can be prevented. Also, a user can be informed of the size of a free area available for recording other broadband programs. Also, a recording area, the insurance of which becomes unnecessary, can be released as a free area.

Also, according to the invention, when the inputting of the recording reservation is finished, the preferential recording area having a necessary size for recording the entire first to last episodes of the program is ensured. Thus, an occurrence of a situation, in which a recording area is insufficient for the program, can be prevented. Consequently, the entire broadcast program, which is designated as an object to be recorded and is to be broadcasted over a plurality of times, can surely be recorded by making a recording reservation only once.

Also, in a case where the preferential recording mode is not designated for the recording reservation, and where the number of times of broadcasting the recording-reserved program is 1 though the preferential recording mode is designated for the recording reservation, a user is not prompted to input the number of times of broadcasting the program. Thus, unnecessary increase in the number of items, which are to be inputted when a recording-reservation is made, can be prevented.

Also, in a case where the free area changes because the preferential recording area is ensured, the size of the free area is indicated every time when the free area changes. Thus, a user can be informed of the size of a free area available for recording other broadband programs.

BRIEF DESCRIPTION OF THE DRAWINGS

These and other objects and advantages of this invention will become more fully apparent from the following detailed description taken with the accompanying drawings in which:

FIGS. 8A to 8C are explanatory diagrams illustrating a display state caused when a recording reservation is inputted.

DETAILED DESCRIPTION OF THE EMBODIMENTS

Hereinafter, an embodiment of the invention is described with reference to the accompanying drawings.

Figure 1:
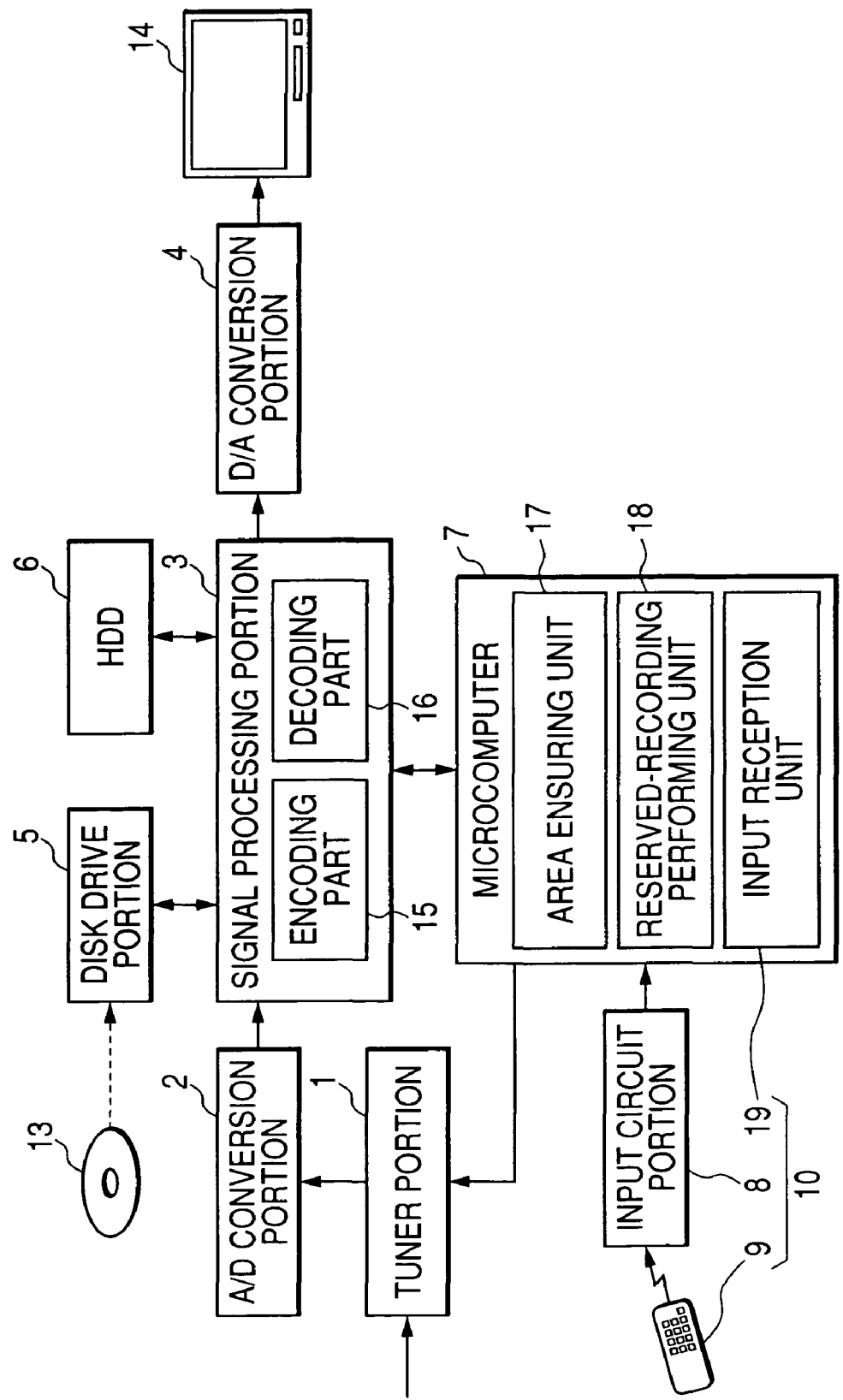
FIG. 1 is a block diagram illustrating the electrical configuration of a HDD recorder of the type integral with a DVD drive, which is an embodiment of a video and audio recording apparatus according to the invention.

FIG. 1 is a block diagram illustrating the electrical configuration of a HDD recorder of the type integral with a DVD drive, which is an embodiment of a video and audio recording apparatus according to the invention.

Referring to this figure, a tuner portion 1 receives a commercial broadcast program of a channel designated by using a microcomputer 7 (hereunder referred to as a "micon"). Also, the tuner portion 1 outputs a received analog video signal (including an analog audio signal) to an A/D conversion portion 2. The A/D conversion portion 2 converts the analog video signal, which is outputted from the tuner portion 1, into a digital video signal (hereunder referred to simply as a video signal (including a digital audio signal)). Then, the resultant video signal is outputted by the A/D conversion portion 2 to a signal processing portion 3.

A disk drive portion 5 is operative to record video and audio information, which is outputted from a signal processing portion 3, in a DVD 13. Also, the disk drive portion 5 reproduces the video and audio information recorded the DVD 13, and outputs the reproduced signal to the signal processing portion 3. A hard disk drive portion 6 (hereunder referred to as a HDD) records the video and audio information, which is outputted from the signal processing portion 3, therein. Also, the HDD 6 reproduces the video and audio information recorded therein, and outputs the reproduced information to the signal processing portion 3. A D/A conversion portion 4 converts a digital video signal (including a digital audio signal), which is outputted from the signal processing portion 3, into an analog video signal (including an analog audio signal) and outputs the analog video signal to a television receiver 14 externally provided.

The signal processing portion 3 performs compression processing of a video signal, which is outputted from the A/D conversion portion 2, according to MPEG-2 method (AC-3 method for an audio signal) by using an encoding portion 15. Then, the signal processing portion 3 outputs the obtained video and audio information to the disk drive portion 5 and the HDD 6. Also, the signal processing portion 3 performs expansion processing of the video and audio information outputted from the disk drive portion 5 and the HDD 6 according to the MPEG-2 method by using a decoding portion 16. Then, the signal processing portion 3 outputs the obtained digital video signal (including a digital audio signal expanded according to the AC-3 method) to the D/A conversion portion 4. Also, the signal processing portion 3 transfers video and audio information, which is outputted from the disk drive portion 5, to the HDD 6 according to an instruction issued from the micon 7. Furthermore, the signal processing portion 3 transfers video and audio information, which is outputted from the HDD 6, to the disk drive portion 5.

An input circuit portion 8 has key switches, such as a power key, provided on a front panel of an apparatus body and also has a light receiving unit adapted to receive infrared signals transmitted from a remote controller (hereunder referred to as a "remocon") 9. Instructions issued from a user are inputted to the input circuit portion 8. Also, the input circuit portion 8 outputs the instructions, which are inputted from a user, to the micon 7.

The micon 7 controls a primary operation of the apparatus serving as the HDD recorder of the type integral with the DVD drive. That is, the micon 7 controls a channel, through which a signal is received by the tuner portion 1, according to the instruction inputted from the user to the remocon 9. The micon 7 controls the signal processing portion 3 and also controls the disk drive portion 5 and the HDD 6 through the signal processing portion 3 thereby to reproduce video and audio information recorded in the DVD 13 and to display the reproduced information in the television receiver 14. Also, the micon 7 controls an operation of recording a broadcast program, which is received by the tuner portion 1, in the DVD 13.

Also, the micon 7 controls an operation of reproducing video and audio information recorded in the HDD 6 and displaying the reproduced information in the television receiver 14. The micon 7 controls an operation of recording the program, which is received by the tuner portion 1, in the HDD 6. Further, the micon 7 performs a control operation of transferring video and audio information, which is outputted from the disk drive portion 5, to the HDD 6 and also performs a control operation of transferring video and audio inf9ormaition, which is outputted from the HDD 6, to the disk drive portion 5.

Also, parts of functions of the micon 7 implement an area ensuring unit 17, a reserved-recording performing unit 18, and an input reception unit 19. Incidentally, the reservation input unit 10 is implemented by the remocon 9, the input circuit portion 8, and the input reception unit 19.

When a recording reservation is inputted, the input reception unit 19 displays a window, in which the inputting of necessary information for recording-reservation is prompted, by controlling an on-screen display (not shown) of the signal processing portion 3. Also, information on a recording-reservation inputted corresponding to the display of this window is stored.

Figure 2:
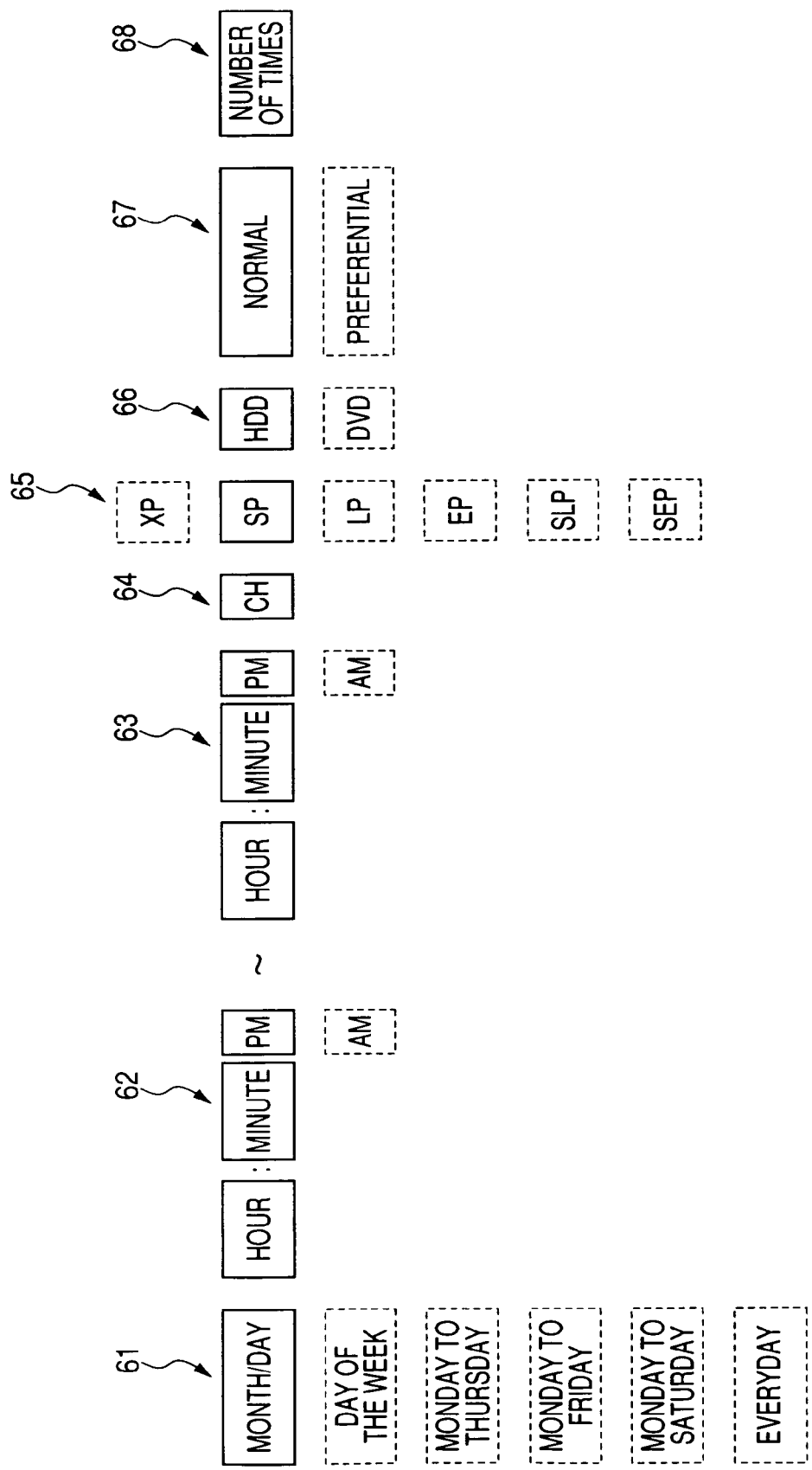
FIG. 2 is an explanatory diagram illustrating a list of input items when a recording reservation is inputted.

FIG. 2 shows items, the inputted information on which is received by the input reception unit 19. An item 61 designates a date on which recording is performed. Designatable options are a specific date designated by specifying a month and a day, a specific day of week, Monday to Thursday of every week, Monday to Friday of every week, Monday to Saturday of every week, and everyday. An item 62 designates a start time of recording. An item 63 designates an ending time of recording. An item 64 designates a channel through which input information is received. An item 65 designates a recording mode. An item 66 designates a recording medium on which a program is recorded.

An item 67 is used to designate which of a normal recording mode, in which recording of a broadcast program is performed on a recordable area (a free area) when the recording is performed, and a preferential recording mode, in which the recording of a broadcast program is performed on a preferential recording area when the recording is performed, is selected corresponding to the inputted recording reservation. An item 67 designates the number of times of broadcasting the program, that is, the number of times of recording the program.

The number of broadcasting the program, which is designated by the item 68, is prompted to input only in a case where the items are selected so that the number of times of recording is plural, for example, in a case where the preferential recording mode is selected according to a value inputted in the field of the item 67, and where a specific day of week is selected according to a value inputted in the field of the item 61. Therefore, for example, in a case where the normal recording mode is selected according to a value inputted in the field of the item 67, the item 68 is omitted from those which need inputting. Similarly, in a case where the preferential recording mode is selected according to a value inputted in the field of the item 67, and in a case where a specific date is designated in the field of the item 61 by specifying a month and a day, the item 68 is omitted from those which need inputting.

In a case where the preferential recording mode is selected corresponding to the recording reservation, the area ensuring unit 17 ensures a preferential recording area, which has a size necessary for recording the recording-reserved program, on the HDD 6 when the HDD is selected according to a value inputted in the field of the item 66. When the DVD is selected according to a value inputted in the field of the item 66, the area ensuring unit 17 ensures such a preferential recording area on the DVD 13. Incidentally, the size of the preferential recording area to be ensured is obtained by multiplying the size of a recording area needed to record one part of the recording-reserved program, which part is to be broadcasted one time, by the number of times of broadcasting the recording-reserved program, which is inputted in the field of the item 68. However, when no data is inputted in the field of the item 68, the number of times of recording is set to be 1. Thus, the size of the preferential recording area is a size needed to record the recording-reserved program once.

The preferential recording area is ensured every time when a recording reservation, the recording mode corresponding to which is the preferential recording mode, is made. The preferential recording area having been once ensured is set to be inhibited from being used for recording a broadcast program other than the corresponding recording-reserved program. That is, in a case where the reserved-recording of the broadcast program, for which the normal recording mode is designated, is performed, even when there is no available recording area other than the preferential recording area, the preferential recording area is inhibited from being used for recording this program. Also, in a case where the recording of a broadcast program other than recording-reserved programs is performed (for example, the recording of a broadcast program is performed by operating a recording key while a user views this program), it is inhibited from recording this program on the preferential recording area.

In a case where the reserved-recording of the program is the recording thereof to be performed a plurality of times and where the preferential recording mode is designated corresponding to this reserved-recording, the reserved-recording performing unit 18 performs the recording of the recording-reserved program on the preferential recording area by the number of times of broadcasting thereof, which is inputted in the field of the item 67. Also, in a case where the reserved-recording of the program is the recording thereof to be performed only once and where the preferential recording mode is designated corresponding to this reserved-recording, the reserved-recording performing unit 18 performs the recording of the recording-reserved program on the preferential recording area only once. In a case where the normal recording mode is designated corresponding to the reserved-recording of a broadcast program, this broadcast program is recorded on a free area other than the preferential recording area.

Hereinafter, a supplemental description is described below. When ensuring the preferential recording area, the area ensuring unit 17 indicates the size of the ensured preferential recording area and the size of the free area other than the preferential recording area. Also, in a case where the recording reservation, for which the preferential recording area is ensured, is canceled, the ensured preferential recording area is released as a free area, on which another program can be recorded.

In a case where the recording reservation is canceled after a part (for instance, 5) of the number (for example, 12) of times of broadcasting, which is inputted in the field of the item 68, a part of the preferential recording area ensured for the recording reservation, which part has a size needed to record the broadcast program 7 times, remains unused for recording and is released as a free area.

The HDD 6 serves as an information recording medium on which the broadcast program received by the tuner portion 1 is recorded as video and audio information through the A/D conversion portion 2 and the signal processing portion 3. Also, the DVD 13 serves as an information recording medium on which the broadcast program received by the tuner portion 1 is recorded as video and audio information through the A/D conversion portion 2, the signal processing portion 3, and the disk drive portion 5.

Figure 3:
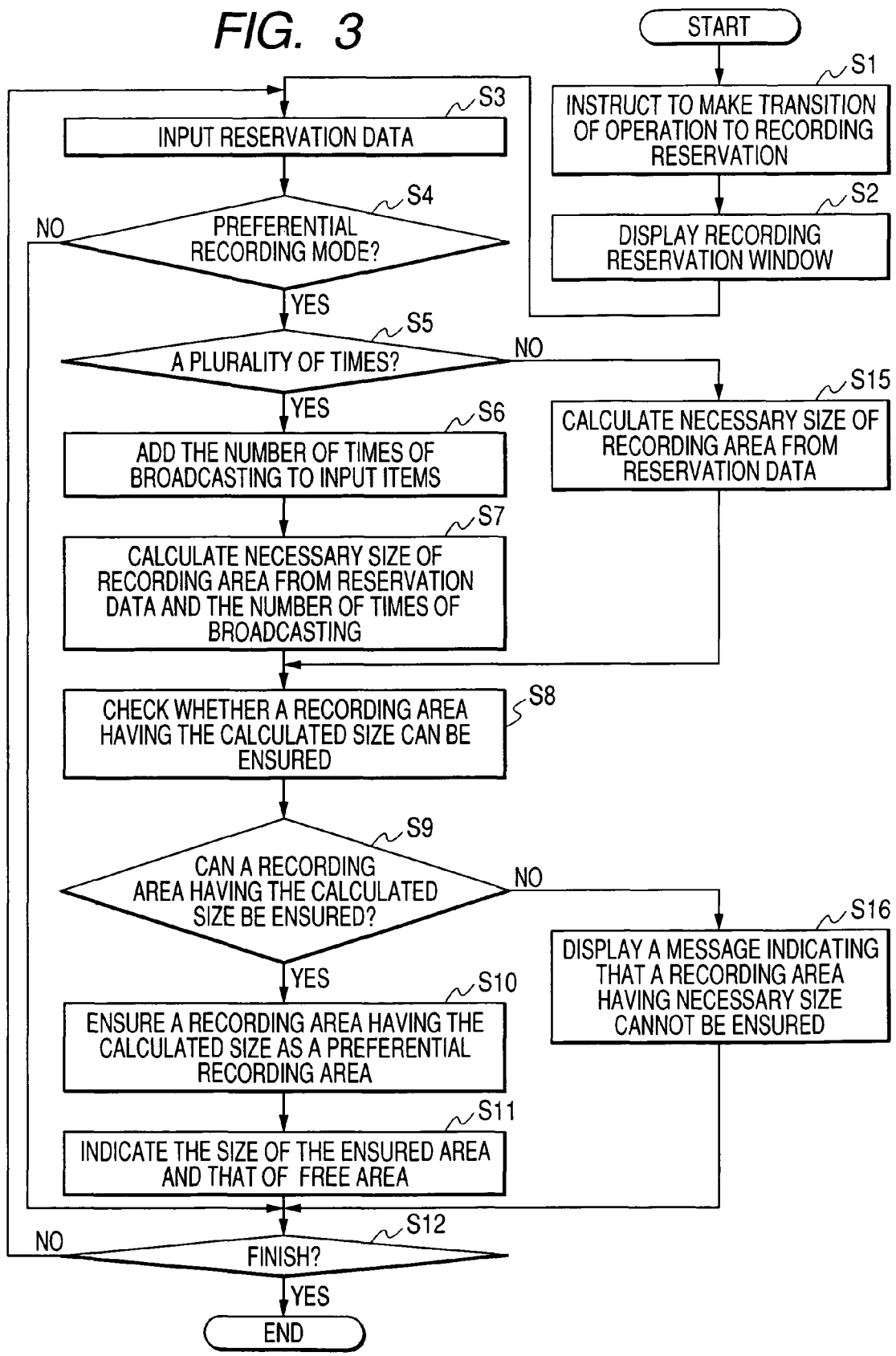
FIG. 3 is a flowchart illustrating a principal operation performed by an embodiment when a recording reservation is inputted.
Figure 4:
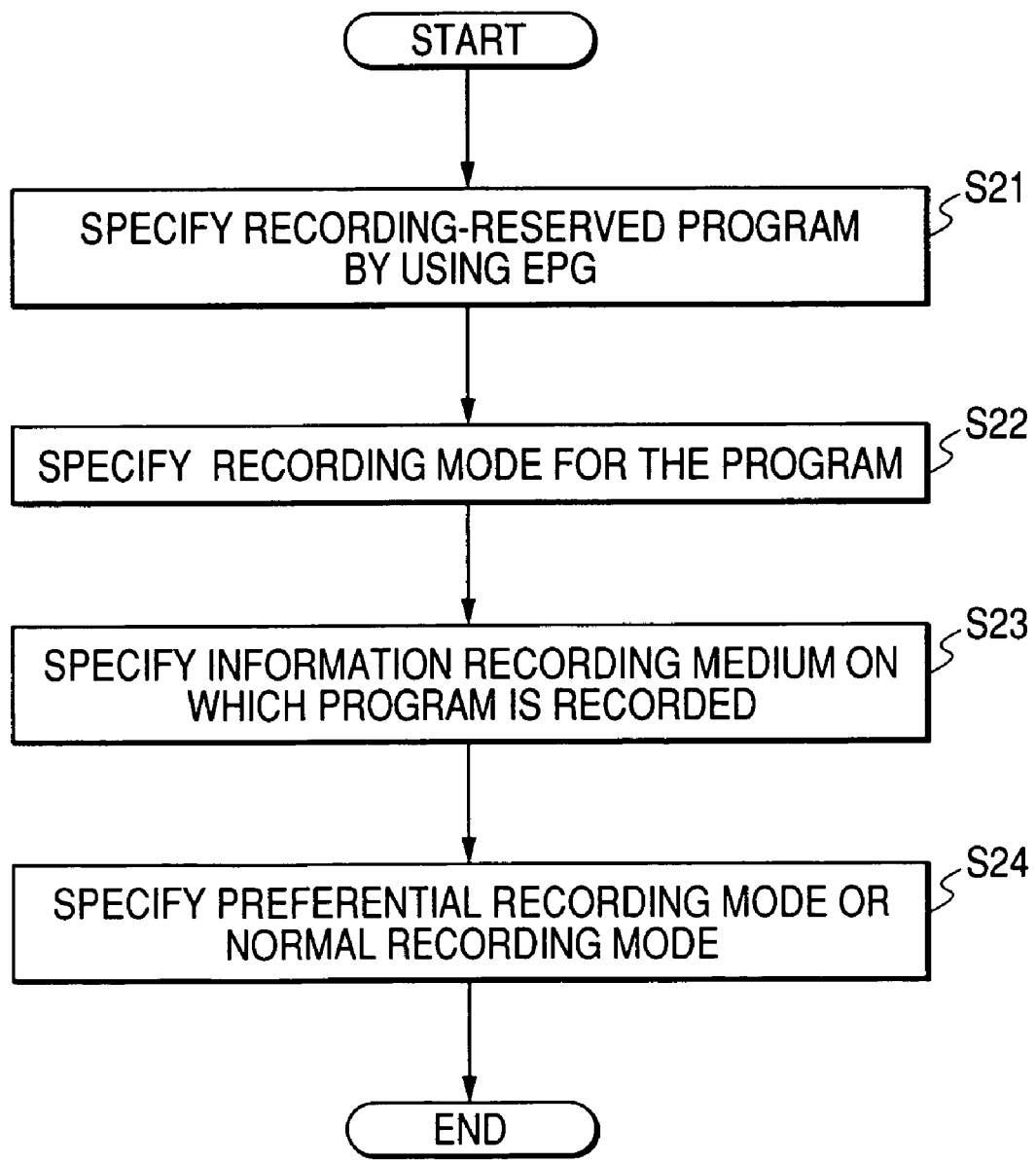
FIG. 4 is a flowchart illustrating a procedure for inputting reservation data corresponding to a recording reservation.
Figure 5:
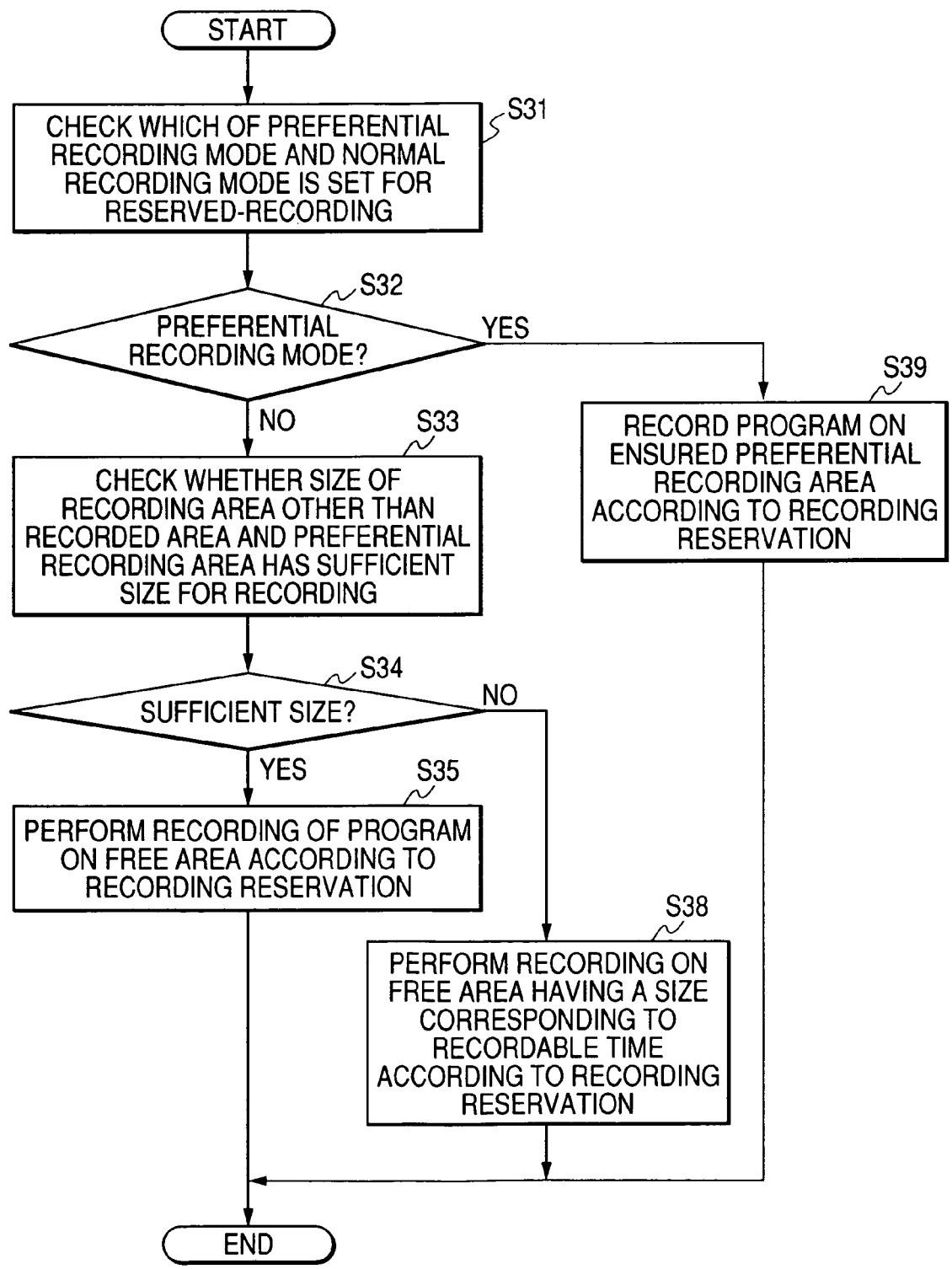
FIG. 5 is a flowchart illustrating a primary operation performed by the embodiment when recording is performed according to a recording reservation.
Figure 6:
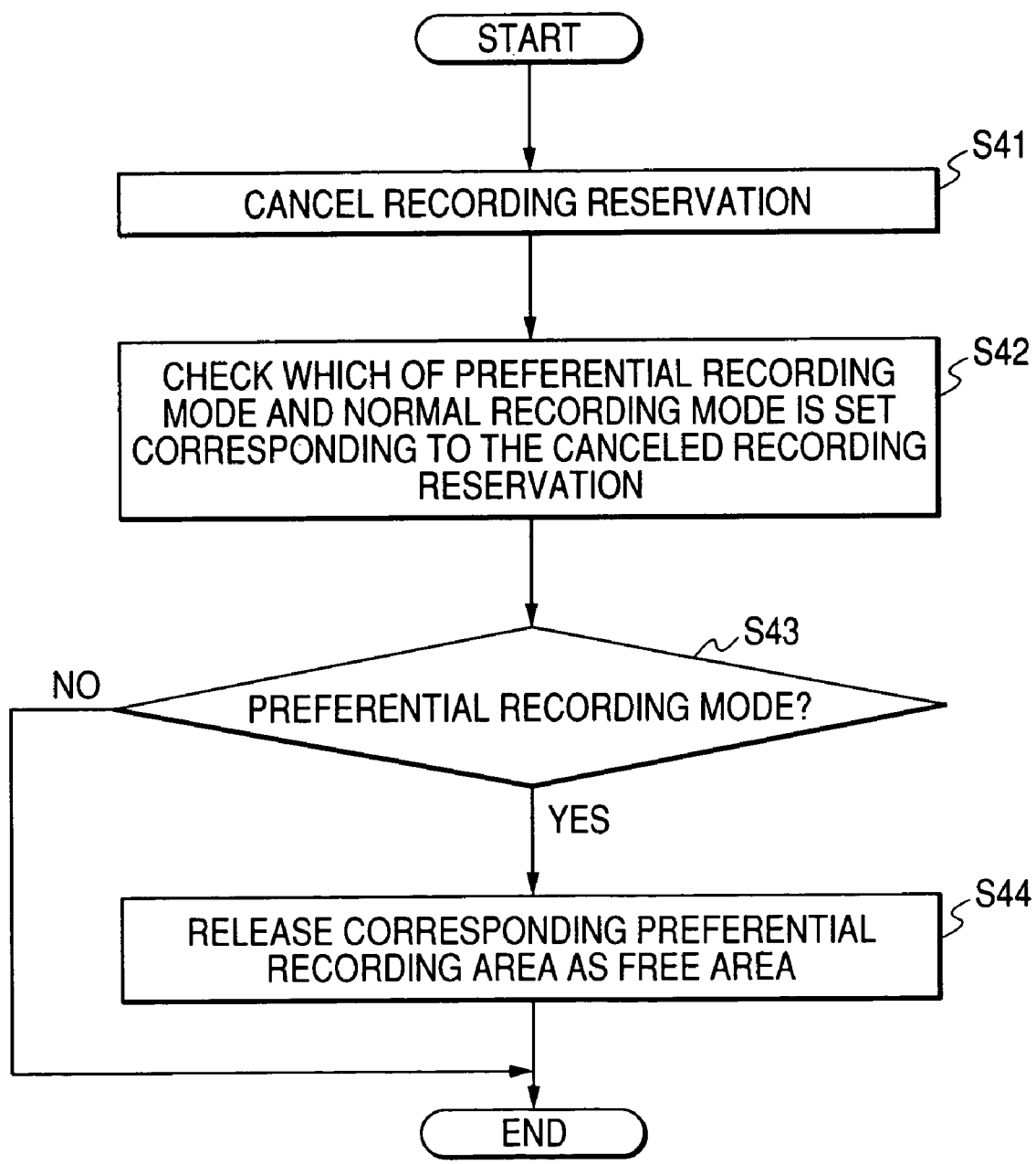
FIG. 6 is a flowchart illustrating a principal operation performed by the embodiment when a recording reservation is canceled.

FIG. 3 is a flowchart illustrating a principal operation performed by an embodiment when a recording reservation is inputted. FIG. 4 is a flowchart illustrating a procedure for inputting reservation data corresponding to a recording reservation. FIG. 5 is a flowchart illustrating a primary operation performed by the embodiment when recording is performed according to a recording reservation. FIG. 6 is a flowchart illustrating a principal operation performed by the embodiment when a recording reservation is canceled. An operation of the embodiment is described below by referring to these figures, as need arises.

In step S1, a user gives an instruction to make the transition of the operation to a recording reservation by using the remocon 9. The input reception unit 19 displays a recording reservation window in step S2. Then, information representing a broadcast program to be recording-reserved is inputted by using this window in step S3. FIG. 4 illustrates an input procedure at that time. A recording-reserved program is specified by using EPG, instead of inputting information on a recording start time, a recording finish time, a receiving channel, and so on in step S21. Subsequently, a recording mode is specified in step S22. Then, a recording medium, on which a program is recorded, is specified in step S23.

Figure 7A:
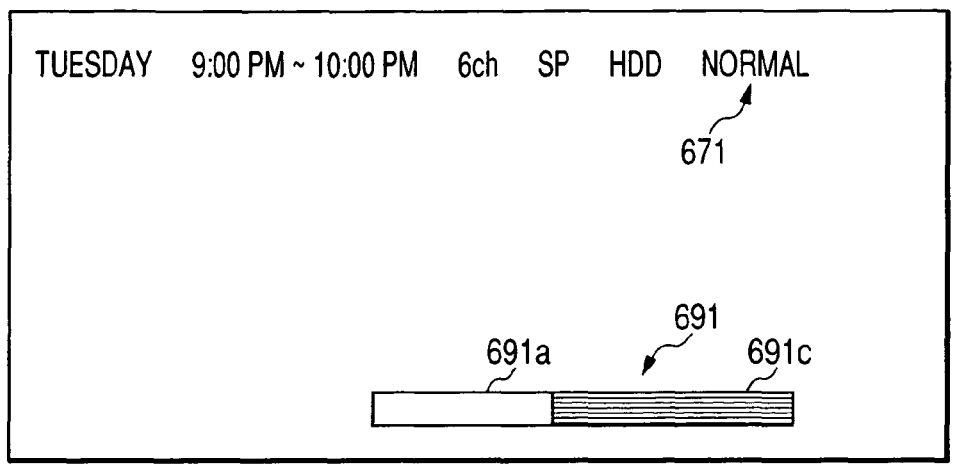
FIG. 7A to 7C are explanatory diagrams illustrating a display state caused when a recording reservation is inputted.

FIG. 7A illustrates an example of the display of input information. In a field of the item 67 used to select one of the preferential recording mode and the normal recording mode, the word "NORMAL" 671 indicating the normal recording mode, which is a default value, is displayed. Also, a bar 691 is displayed at a lower part of the window. Reference numeral 691a in the bar 691 designates the size of a recorded area. Reference numeral 691c denotes the size of a free area.

Figure 7B:
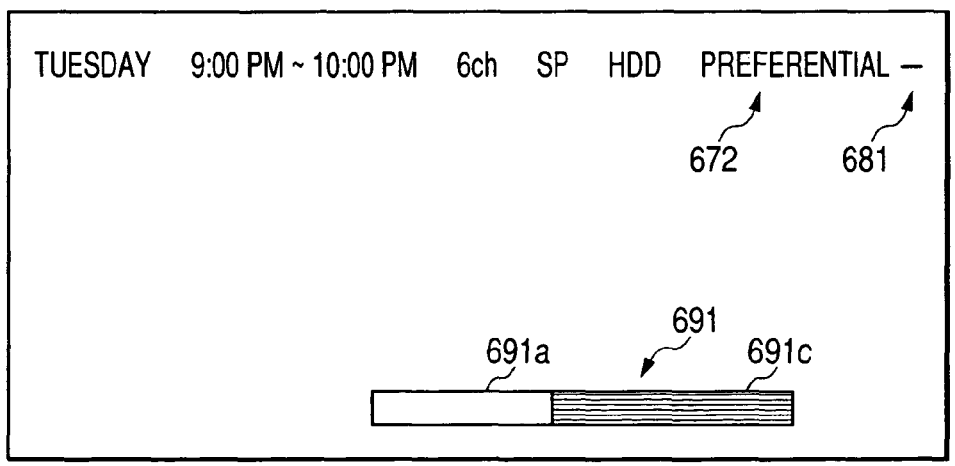

When the mode specified in the field of the item 67 is changed to the preferential recording mode in this state in step S24, the word "PREFERENTIAL" 672 indicating the preferential recording mode is displayed in the field of the item 67, as illustrated in FIG. 7B. Also, when the preferential recording mode is specified, the operation proceeds to steps S4 and S5, in which it is checked whether the recording reservation is made corresponding to a broadcast program, the number of times of broadcasting of which is plural.

Figure 7C:
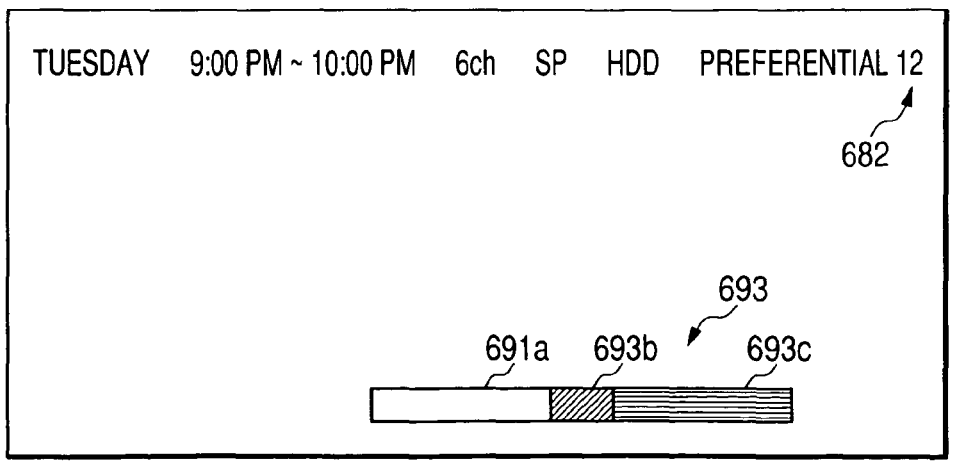

In this case, the date designated in the field of the item 61 is Tuesdays. The number of times of broadcasting is set to be plural. Thus, the number of times of broadcasting is added to the input items. Thus, the operation proceeds to step S6 from step S5. The symbol "–" 681 prompting a user to input the number of times of broadcasting is displayed at the right side of the word "PREFERENTIAL" 672. Thus, a user is prompted to input the number of times of broadcasting. When the number of times of broadcasting is inputted, a numerical value indicating the inputted number of times of broadcasting, which is designated by 682 in FIG. 7C, is displayed in the field of the item 68.

When the number of times of broadcasting is inputted, the input reception unit 19 obtains the necessary size of a recording area for recording a broadcast program, which is to be broadcasted once, from the recording start time, the recording finish time, and the recording mode. Subsequently, the input reception unit 19 calculates the necessary size of the recording area (that is, the preferential recording area) for recording the first to twelfth (that is, the last) episodes of the broadcast program by multiplying the size of a recording area needed to record each episode of the recording-reserved program, which episode is to be broadcasted once, by the number of times of broadcasting the recording-reserved program in step S7. Subsequently, the input reception unit 19 checks in step S8 whether the preferential recording area having the calculated size can be ensured.

If the preferential recording area having the calculated size can be ensured, this preferential recording area is ensured in steps S9 and S10 as a recording area inhibited from being used for recording another recording-reserved program and for recording a program by operating the recording key while a user views this program. Subsequently, to indicate that the preferential recording area is ensured, a bar indication 691 is changed to another bar indication 693. Incidentally, in the bar indication 693, the size of the ensured preferential recording area 693b is indicated. Also, the size of a free area 693c other than the preferential recording area is indicated. Then, if the next recording reservation is inputted, the operation proceeds from step S12 to S3. Subsequently, a similar process is repeated.

In step S8, it is checked whether the preferential recording area having the calculated size can be ensured. If it is found in step S8 that the free area is small and that the preferential recording area having the calculated size cannot be ensured, the operation proceeds to step S16 from step S9. Then, as illustrated in FIG. 8C, a message 699, which indicates that the preferential recording area having the necessary size cannot be ensured, is displayed (in the bar indication 695, the recorded area 695a and the free recording space 695c are displayed).

It is now assumed that the inputting of the first recording reservation illustrated in FIG. 7C is finished, and that a second recording reservation is inputted, as illustrated in FIG. 8A. Also, it is assumed that the normal recording mode is designated corresponding to this reservation. In this case, although the number of times of broadcasting the program is plural, the operation proceeds from step S4 to step S12 in which it is determined whether the next recording reservation is inputted. That is, the second recording reservation is completed without prompting a user to input the number of times of recording a program and without ensuring the preferential recording area corresponding to the inputted recording reservation. Thus, the bar indication 693 is not changed.

Also, it is assumed to be continued to make the recording reservation. FIG. 8B illustrates a display condition in which four recording reservations are inputted. The preferential recording mode is designated corresponding to the fourth recording reservation. However, in this case, a value representing the date 61, on which the program is recorded, indicates a specific month and a specific day. Thus, the number of times of broadcasting the program is not plural. Therefore, in this case, the operation proceeds from step S5 to step S15 in which the necessary size of the preferential recording area for recording the program to be broadcasted once is calcualted.

Subsequently, the operation proceeds to step S8 in which it is checked whether the preferential recording area having the calculated size can be ensured. Then, a similar operation is performed. That is, even in a case where the preferential recording mode is designated, and where a value inputted in the field of the item 61 indicates that the number of times of broadcasting is 1, the symbol "–", which indicates that a user is prompted to input the number of times of broadcasting, is not displayed. Thus, the inputting of the number of times of broadcasting remains omitted. Also, the bar indication 694 is displayed. The size of the preferential recording area 694*b* is displayed and indicates that the size thereof increases (the size 694*c* of the free area other than the preferential recording area is displayed).

When the recording of the program corresponding to the recording reservation inputted by the aforementioned method is performed, the reserved-recording performing unit 18 checks in step S31 which of the preferential recording mode and the normal recording mode is designated corresponding to the recording reservation. If the preferential recording mode is designated, the recording of the broadcasting program is performed on the preferential recording area ensured corresponding to the reserved-recording to be performed in steps S32 and 39. Therefore, a recording area for recording the recording-reserved broadcast program, the mode of recording of which is designated to be the preferential recording mode, is preliminarily ensured as the preferential recording area. This prevents occurrences of situations where the program cannot be recorded at all or can be recorded only in a recording mode in which a bit rate is set to be lower than a designated value, because of the facts that there is no free recording space and that the size of the free area is small.

On the other hand, in a case where the normal recording mode is designated corresponding to the recording reservation, it is checked in steps S32 and S33 whether the size of a recording area other than the recorded area and the ensured preferential recording area, that is, the size of a free area is sufficient for recording a broadcast program. Then, if the size of the free area is sufficient, the broadcast program is recorded on the free area according to the recording reservation in steps S34 and S35. Conversely, if not sufficient, only a part of the broadcast program, which part corresponds to a recordable time, is recorded on the free area according to the recording reservation in steps S34 and S38.

In a case where the inputted recording reservation is canceled in step S41, the input reception unit 19 checks in step S24 which of the preferential recording mode and the normal recording mode is designated corresponding to the canceled recording reservation. If the preferential recording mode is designated, the preferential recording area ensured for performing reserved-recording is released as a free area in steps S43 and S44 so as to be freely used to record another broadcast program. Conversely, it the normal recording mode is designated corresponding to the canceled recording reservation, the entire ensured preferential recording area is used to record other recording-reserved broadcast programs, the recording mode corresponding to which the preferential recording mode is designated. Consequently, the preferential recording area is not released.

In a case where the canceled recording reservation corresponds to the program to be broadcasted a plurality of times, and where the recording of apart of the broadcast program has already been finished, the preferential recording area ensured for recording the remaining part of the broadcast program is released. However, the already recorded preferential recording area is preserved as the recorded area. Thus, the recorded information is stored.

In the foregoing description, it has been described the case that the HDD 6 is used as the information recording medium. Even in a case where the DVD 13 is used as the information recording medium, similar results are obtained. Incidentally, in a case where the DVD 13 is exchanged after the recording reservation is inputted, the size of the free area changes. Thus, in a case where the preferential recording area is ensured corresponding to the recording reservation designating the DVD 13 as a medium, in which the program is recorded, when the DVD 13 is replaced, the preferential recording area is treated as not to be ensured. Therefore, at that time, in the case of the recording reservations (the DVD 13 is employed as the information recording medium in which the program is recorded), the recording mode corresponding to which the preferential recording mode is designated in the field of the item 67, when the DVD 13 is replaced, the recording mode designated in the field of the item 67 is automatically changed to the normal recording mode (also, the indication of the item 67 in a recording widow is automatically changed).

Incidentally, the invention is not limited to the aforementioned embodiment. Although the case of applying the invention to the HDD recorder of the type integral with the DVD drive, the invention can be similarly applied to other apparatuses, for example, an optical disk recorder, such as a DVD recorder, in which an available information recording medium is only an optical disk, such as a DVD, and a HDD recorder in which an available information recording medium is only a hard disk.

What is claimed is:

1. A video and audio recording apparatus comprising:
    a reservation inputting unit to which a recording reservation of a broadcast program received by a tuner portion is inputted;
    an area ensuring unit adapted to ensure a preferential recording area, which has a size necessary for recording a recording-reserved broadcast program, in an information recording medium; and
    a reserved-recording performing unit adapted to record a broadcast program on the ensured preferential recording area according to the recording reservation, wherein:
    the reservation inputting unit is adapted to receive a designation indicating which of two modes is employed between a preferential recording mode, in which recording of the program is performed on the ensured preferential recording area, and a normal recording mode, in which recording of the program is performed on a recording area during the recording is performed, so as to perform recording corresponding to a recording reservation that is being inputted, and is also adapted to prompt a user to input the number of times of broadcasting the program in a case where the preferential recording mode is designated corresponding to the recording reservation, which is being inputted, and where the recording reservation, which is being inputted, is a reservation of recording a broadcast program to be broadcasted over a plurality of times, which includes a reservation of recording the program every specific day of a week;
    the area ensuring unit is adapted to ensure a preferential recording area whose size is obtained by multiplying the size of a recording area needed to record one part of the recording-reserved program, which part is to be broadcasted one time, by the number of times of broadcasting the recording-reserved program, and is also adapted to indicate a size of the preferential recording area and that of a free area other than the preferential recording area, and to release, when the recording reservation, for which the preferential recording area is ensured, is canceled, a part of the preferential recording area, in which no program is recorded, as a free area in the preferential recording area ensured for the recording reservation that is canceled; and the reserved-recording performing unit performs the recording of the recording-reserved broadcast program on the preferential recording area the inputted number of times of broadcasting.

2. A video and audio recording apparatus comprising:

a reservation inputting unit to which a recording reservation of a broadcast program received by a tuner portion is inputted;

an area ensuring unit adapted to ensure a preferential recording area, which has a size necessary for recording a recording-reserved broadcast program, in an information recording medium; and a reserved-recording performing unit adapted to record a broadcast program on the ensured preferential recording area according to the recording reservation, wherein:

the reservation inputting unit is adapted to prompt a user to input the number of times of broadcasting a recording-reserved broadcast program;

the area ensuring unit is adapted to ensure a preferential recording area whose size is obtained by multiplying the size of a recording area needed to record one part of the recording-reserved program, which part is to be broadcasted one time, by the number of times of broadcasting the recording-reserved program; and the reserved-recording performing unit performs the recording of the recording-reserved broadcast program on the preferential recording area the inputted number of times of broadcasting.

3. The video and audio recording apparatus according to claim 2, wherein the reservation inputting unit is adapted to receive a designation indicating which of two modes is employed between a preferential recording mode, in which recording of the program is performed on the ensured preferential recording area, and a normal recording mode, in which recording of the program is performed on a recording area during the recording is performed, so as to perform recording corresponding to a recording reservation that is being inputted, and is also adapted to prompt a user to input the number of times of broadcasting the program in a case where the preferential recording mode is designated corresponding to the recording reservation, which is being inputted, and where the recording reservation, which is being inputted, is a reservation of recording a broadcast program to be broadcasted over a plurality of times, which includes a reservation of recording the program every specific day of a week.

4. The video and audio recording apparatus according to claim 2, wherein the area ensuring unit is adapted to indicate, when the preferential recording area is ensured, a size of the ensured preferential recording area and that of a free area other than the preferential recording area.

\* \* \* \* \*